United States Patent [19]
Morin

[11] Patent Number: 4,548,665
[45] Date of Patent: Oct. 22, 1985

[54] METHOD FOR MANUFACTURING AN ELEMENT HAVING A CURVED SURFACE FROM A RIGID PANEL OF A MATERIAL OF THE "HONEYCOMB" TYPE AND THE PRODUCT OBTAINED

[75] Inventor: Claude P. Morin, Peymeinade, France

[73] Assignee: Immolding Establishment, Vaduz, Liechtenstein

[21] Appl. No.: 587,895

[22] Filed: Mar. 9, 1984

[30] Foreign Application Priority Data

Mar. 15, 1983 [FR] France ................. 83 04226

[51] Int. Cl.⁴ .............................................. B31D 3/02
[52] U.S. Cl. .................................... 156/197; 156/245; 128/118
[58] Field of Search ............... 156/197, 245; 428/116–118; 220/181

[56] References Cited

U.S. PATENT DOCUMENTS

| | | | |
|---|---|---|---|
| 2,609,068 | 9/1952 | Pajak ................. | 156/197 X |
| 2,704,587 | 3/1955 | Pajak ................. | 428/118 |
| 2,742,387 | 4/1956 | Giuliani ............. | 156/197 X |
| 2,988,809 | 6/1961 | Hall . | |
| 3,133,133 | 5/1964 | Fairbanks .......... | 156/197 X |
| 3,447,163 | 6/1969 | Bothwell et al. ... | 2/412 |
| 3,670,393 | 6/1972 | Almond . | |
| 3,949,651 | 4/1976 | Spencer ............. | 156/197 X |
| 3,996,087 | 12/1976 | May .................... | 156/197 |

FOREIGN PATENT DOCUMENTS

| | | |
|---|---|---|
| 1197841 | 8/1965 | Fed. Rep. of Germany . |
| 1162692 | 9/1958 | France . |
| 1384922 | 11/1964 | France . |
| 2147598 | 3/1973 | France . |
| 2237435 | 2/1975 | France . |
| 2346992 | 11/1977 | France . |
| 2370448 | 6/1978 | France . |
| 945412 | 12/1963 | United Kingdom . |

*Primary Examiner*—David Simmons
*Attorney, Agent, or Firm*—Wenderoth, Lind & Ponack

[57] ABSTRACT

The rigidity of a panel of honeycomb material formed by parallel bands of thin metal spot-welded together and spread apart so as to form regular cavities, is broken by passing this panel in a gripped state between a plurality of cylinders 3, 4, 5 having a hard surface and whose axes are parallel and disposed in such manner as to produce in the panel as many changes in direction at roughly a right angle so as to fold or corrugate the walls of the cavities in a direction roughly parallel to the edges of the apices formed by the sides of the apices. A sandwich is formed by adhering at least one panel 6 treated in this way on a sheet 9 of a thermoplastic material, the sandwich is heated to a temperature for softening the thermoplastic material and the sandwich is placed on a form having the desired curvature and allowed to cool.

6 Claims, 8 Drawing Figures

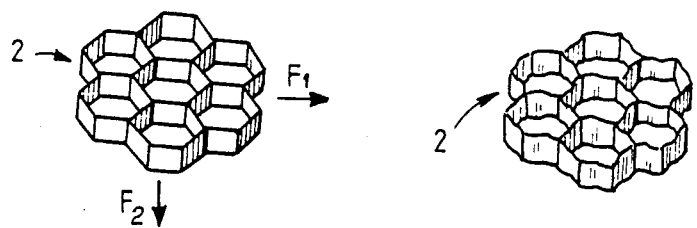
FIG. 1
FIG. 2
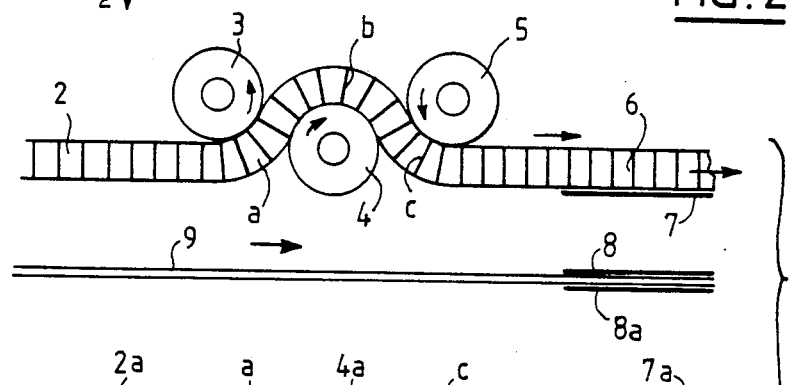
FIG. 3A
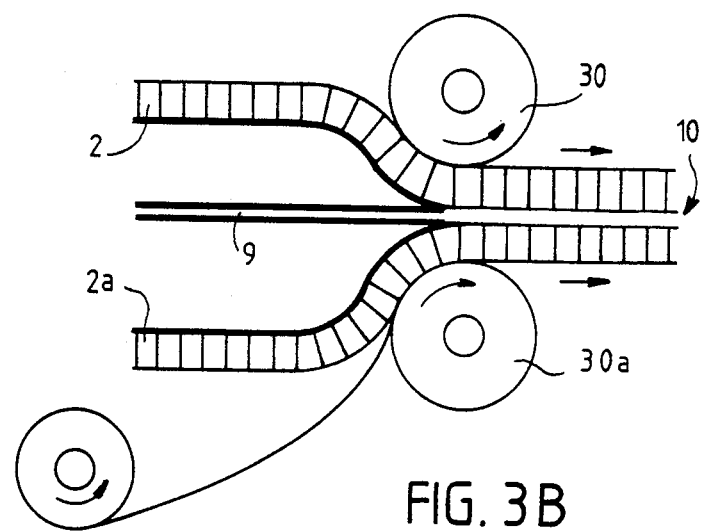
FIG. 3B

METHOD FOR MANUFACTURING AN ELEMENT HAVING A CURVED SURFACE FROM A RIGID PANEL OF A MATERIAL OF THE "HONEYCOMB" TYPE AND THE PRODUCT OBTAINED

The present invention relates to protective helmets employed for example by drivers of vehicles, and in particular motor racing drivers, motor cyclists, pilots of aircraft or other sports machines, and persons working in factories or on working sites, and in particular building and public works sites, and whenever it is necessary to protect the head of a user from violent blows.

These helmets are usually made from a shell of a light and hard material such as a plastics material which is resistant to blows and which forms the rigid element in which is secured a flexible and resiliently yieldable skull cap or inner lining which is shock-absorbing and is in contact with the head of the user.

The material employed for the rigid shell is usually a plastics material, a thermoplastic material or a fabric impregnated with a synthetic resin. The thermoplastic materials are, at the present time, preferred owing to the fact that they permit manufacturing on an industrial scale, which lowers the cost.

The drawback of this method is the very mediocre quality of the products obtained and usually only materials having a rather poor rigidity may be employed under good ageing conditions. Consequently, the conventional shock-absorbing lining or cap mainly made from a foam of a plastics material or an elastomer does not constitute the ideal solution in the obtainment of the required shock-absorbing properties of the helmet.

The material known under the name "honeycomb" made from a metal foil or sheet, for example of aluminium and having a thickness of for example 20 to 90$\mu$, has being found to possess extremely interesting properties of absorption of energy and consequently shock-absorption, while it has a low cost.

However, this honeycomb material, which is made from bands of metal sheet which are parallel and spot-welded together at weld spots in staggered relation and then spread apart so as to form a modular material constituted by a multitude of hexagonal-shaped cavities, although it is extremely supple or flexible in the direction of expansion perpendicular to the plane of the bands, has high rigidity and high fragility in its plane.

Consequently, it has not been possible up to the present time to employ such a material on an industrial scale owing to the difficulty of forming it into a hemispherical shell.

An object of the invention is to overcome this drawback and to permit the construction of an interior shock-absorbing lining or cap of a light material having excellent properties of absorption of energy and capable of compensating for the defects of the materials employed for the shell and at the same time ensuring an improved distribution and absorption of the forces in the event of a blow or impact.

Another object of the invention is to permit the use of the properties of a honeycomb material for constructing shock-absorbing lining caps in protective helmets.

The invention therefore provides a method for manufacturing an element having a partly spherical curved surface by means of said metal "honeycomb" material as defined hereinbefore, wherein the rigidity of a planar honeycomb panel is "broken" by forcing it to pass under a gripped condition between a plurality of rolls whose parallel axes are disposed in such manner as to impart thereto, in succession, a plurality of changes in direction at roughly a right-angle.

Following on this treatment, the walls of the hexagonal cavities are folded in a direction parallel to their plane and transverse to their length so as to permit a differential deformation of these walls whose folds may stretch on one of their edges while they contract on the opposite edge. In this way, it is possible to give the panel of honeycomb material treated in this way a partly spherical shape by means of an impression or a cavity having the desired curved surface.

Another object of the invention is to provide a shock-absorbing lining or inner cap for a protective helmet constituted by a partly-spherical element produced by the method defined hereinbefore.

The features and advantages of the invention will be apparent from the following description given with reference to the accompanying drawings, which are given solely by way of example and in which:

FIG. 1 is a perspective view of a portion of a panel of a honeycomb material formed from aluminium foil or sheet;

FIG. 2 shows the same portion of honeycomb material after treatment in accordance with the invention;

FIGS. 3A and 3B show different stages of the treatment and forming of an energy-absorbing material for producing a lining cap or dome for a protective helmet according to the invention;

FIG. 1 shows a portion of a panel of a "honeycomb" material made from bands of aluminium foil or sheet of a thickness between 20 and 90$\mu$ which are spot-welded at spots in staggered relation, the bands being thereafter stretched in a direction perpendicular to their plane. In this way, there is obtained a modular material formed by a multitude of hexagonal cavities.

Figures 4A, 4B:
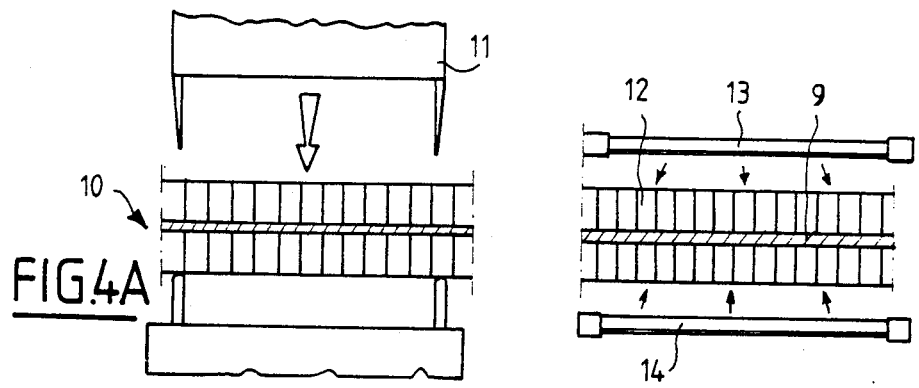
FIGS. 4A and 4B show two stages of the production of a cap.
Figure 5:
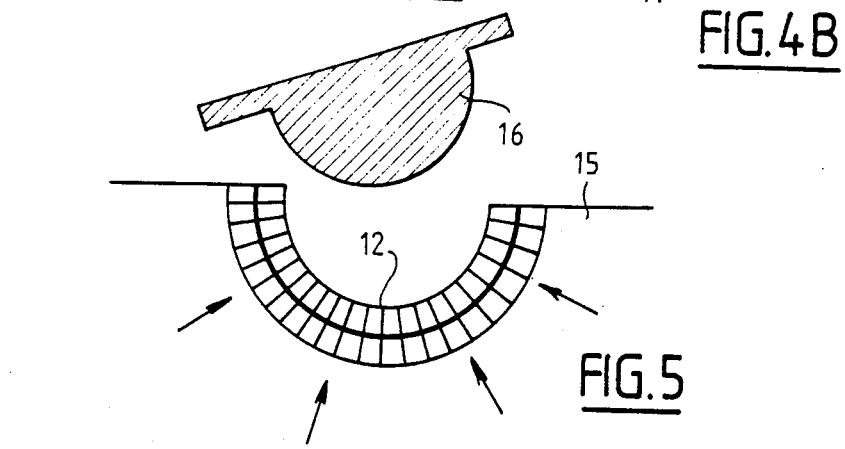
FIG. 5 shows diagrammatically the forming of the cap.
Figure 6:
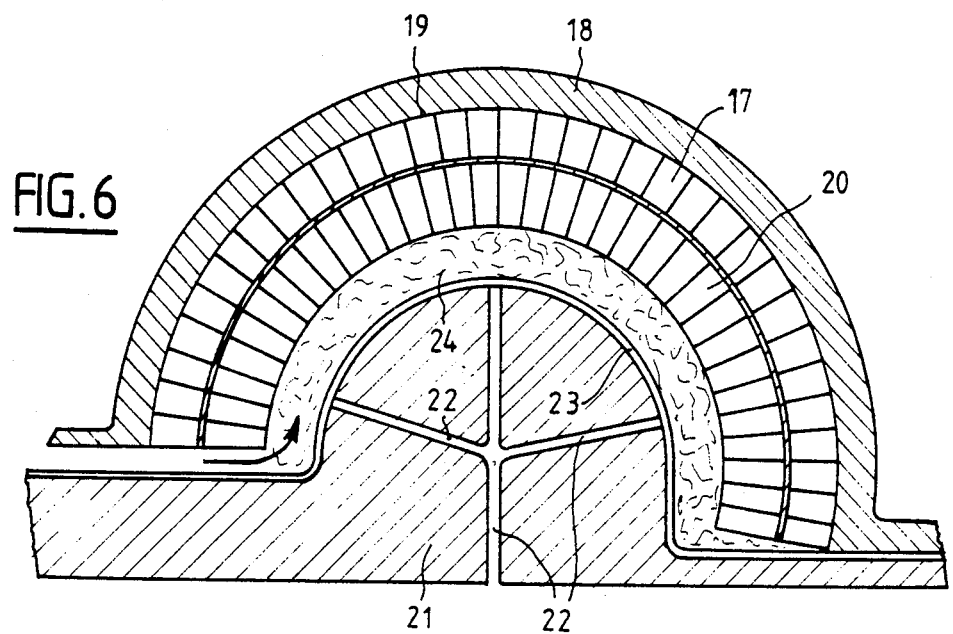
FIG. 6 is a view of the final stage of the production of the cap according to the invention.

It will be understood that this material has high flexibility in the lateral direction (arrows F, FIG. 1), the cavities being free to deform more or less in width and length, but on the other hand resists any attempt to deform it out of its plane owing to the fact that the walls of the cavities are inextensible.

However, this material has excellent properties of absorption of energy owing to the small thickness of the foil or sheet from which it is made, of which the strips, considered individually, have only a small resistance to crushing on their edge, this resistance being, however, considerably multiplied by the fact that the bands or strips constitute adjacent hexagons having common walls. These properties are well known in the art.

In order to be able to impart to such a panel of honeycomb material a partly-spherical shape, it is arranged, in accordance with the invention, to break its rigidity by deforming the walls of the cavities by folding them in their plane, i.e. in a direction parallel to the apices of the corners of the hexagons. The walls of the latter can then be curved while remaining in their plane, the folds formed on one of the edges of each strip being capable of opening while the folds formed on the opposite edge can close.

The upper part of FIG. 3A shows how this result can be obtained in accordance with the invention.

A panel 2 of a honeycomb material, formed as mentioned before, is passed between three successive rolls or cylinders 3, 4 and 5 which have a hard surface and axes which are parallel but disposed in offset relation so as to produce on the panel 2 a first change in direction at roughly 90° at a between the cylinders 3 and 4, followed by a second change in direction at b also at roughly 90° about the cylinder 4, and then a last change in direction at c between the cylinders 4 and 5, the panel resuming its initial direction of travel as shown at 6.

In the course of these three consecutive changes in direction, the panel 2, which is maintained rigidly under a slight pressure between the surfaces of the cylinders, is constrained to deform by a folding of the strips of which it is composed in a direction parallel to the apices of the corners formed by the sides of the hexagons.

Indeed, the strips are constrained to form folds on a part of their width adjacent to the cylinder 3, these folds opening upon the passage around the cylinder 4 while other folds are formed in the part of the strip adjacent to this cylinder, and the opposite process occurs when passing round the third cylinder 5.

Preferably, after this first passage between the successive cylinders, the panel 2 is turned through 90° in its plane about its central axis and is re-introduced in the set of cylinders 3, 4 and 5 through which it passes in the direction of arrow $F_2$ shown in FIG. 1, if the first passage was effected in the direction of arrow $F_1$, or inversely. Thus, the panel is again subjected to stresses due to the three successive changes in direction.

The strips constituting the sides of the cavities are thus corrugated or folded throughout their width as they issue from the device, as shown in FIG. 2 so that there is imparted to the walls of the cavities a possibility of stretching or extension.

The panel which has been rendered more flexible or supple can then be cut into blanks having the shape and dimensions suitable for forming the desired hollow portions of a sphere, for example a star shape. Each blank is then heated, placed on a partly spherical form, made to assume the shape shape and allowed to cool. It can then be removed and used.

To form a lining cap or dome of a protective helmet, there is preferably employed a composite material comprising two superimposed layers of honeycomb material.

Reference will now be made to FIGS. 3A and 3B for describing the method according to the invention for forming such a lining cap for a protective helmet.

Simultaneously with the passage of the panel 2 of the honeycomb material between the cylinders 3, 4 and 5, a second panel 2a is passed in the same direction between rollers 3a, 4a and 5a which are arranged in the same way but in the opposite direction so as to obtain two panels 6, 6a which have been rendered supple or flexible between which a sheet 9 of a thin flexible material is passed. This sheet 9 may be for example of a thermoplastic material. Simultaneously, there is applied a layer of a rapidly setting adhesive, for example a neoprene adhesive, at 7 and 7a on the confronting surfaces of the panels 6 and 6a of honeycomb material, and a layer 8, 8a of a similar adhesive on the thermoplastic material sheet 9.

With reference to FIG. 3B, the two panels 6, 6a are passed between two other cylinders 30, 30a whose spacing corresponds to the total thickness of the two panels 6, 6a and the sheet 9 of thermoplastic material, these cylinders urging the two panels toward each other and adhering them to the opposite surfaces of the sheet 9. In this way, there is obtained a sandwich 10 comprising two thicknesses of a honeycomb material adhered to each side of a flexible core 9 of a thermoplastic material.

This relatively flexible structure 10 is then cut, as shown in FIG. 4A, by means of a punch and die 11, into suitable portions or blanks 12 for constituting a dome or cap for a protective helmet.

This blank has for example a star-shape in plan in the manner conventional in the art, the cutting of which permits the obtainment of an even surface without differences in density.

The blank 12 is then heated between heating systems 13, 14 and the heat is immediately transmitted, by the aluminium foil or sheet constituting the honeycomb material, to the sheet 9 of thermoplastic material which rapidly softens, and at this moment the blank 12 is placed in a hollow form 15 in which it undergoes a forming operation by means of a punch 16 in the known manner.

The blank is allowed to cool in the form or die 15 and then extracted for the final operation in the production of the helmet which consists of placing the cap 16 obtained in a shell 18.

Preferably, in order to add a comfort lining inside the helmet, a sheet 20 of polyurethane is adhered to the inner surface of the cap or dome and the assembly is disposed on a form 21, through which pass a network of conduits 22, and on which was previously disposed a sheet 23 of a fluidtight cloth, and a polyurethane foam is injected between the cap 17 and the sheet 23, as shown at 24, the foam thus formed providing the comfort of the contact with the head of the user. At the same time as the introduction of the foam, a suction is created through the conduits 22 and the cover of the mould is closed on top of the shell 18.

It will be understood that the sheet 20 of polyurethane prevents the foam from penetrating the interior of the cavities.

The finished helmet is then withdrawn from the mould.

The cap or dome 17 formed from a sandwich of honeycomb material having thin walls has excellent properties of energy aborption while remaining light and, moreover, the volume of air trapped in the cavities constitutes an excellent thermal insulation imparting an additional advantage to the helmet constructed according to the invention.

It will be noticed that the sandwich material from which the cap 17 is made may be made from two panels of honeycomb material having different thicknesses and/or densities of cavities.

The sheet 23 of cloth is of course of a type suitable for providing a pleasant contact and the maximum of comfort to the user.

What is claimed is:

1. A method for manufacturing an element having a curved surface substantially in the shape of a portion of a sphere, from a rigid panel having a honeycomb structure, which panel comprises thin parallel bands spot-welded together by staggered spot-welds and stretched by spreading the bands apart so as to form regular cavities, said method comprising breaking the rigidity of a planar panel having said structure by passing the panel between a plurality of cylinders having a hard surface and axes of rotation which are parallel but offset so as to impart to the panel as many changes in direction as there are cylinders at substantially a right angle so as to fold or corrugate the walls of the cavities roughly in a direction parallel to edges of apices formed by sides of the apices, heating the panel rendered supple in this way and placing it on a form which is at least partly spherical where the panel cools and assumes the desired shape.

2. A method according to claim 1, wherein for the purpose of breaking the rigidity of the panel it is passed two times between the successive cylinders by turning the panel through 90° in the plane of the panel between the two passages between the cylinders.

3. A method according to claim 1, comprising cutting the panel which has been rendered supple in accordance with a shape and dimensions corresponding to a desired hollow portion of a sphere, before heating and forming the panel.

4. A method according to claim 1, comprising forming a sandwich by adhering at least one said panel on a sheet of a thermoplastic material, heating said sandwich to a temperature of softening of the thermoplastic material, disposing said sandwich on a form having the desired curvature and allowing said sandwich to cool.

5. A method according to claim 1, comprising simultaneously passing two said panels between two sets of cylinders in inverted staggered relation, introducing a sheet of a flexible thermoplastic material between said two panels rendered in this way supple, adhering the sheet of flexible material and said panels together so as to form a sandwich, and heating and forming said sandwich at a desired curvature.

6. A method according to claim 1, wherein said panel having a honeycomb structure is composed of a metal sheet which has a thickness of between 20 and 90μ.

* * * * *